United States Patent [19]

Dilcher

[11] Patent Number: 4,617,756
[45] Date of Patent: Oct. 21, 1986

[54] SWINGABLE SLIDING DOOR FOR A MOTOR VEHICLE UTILIZING A SWING ARM MOUNTED ON THE BODY OF THE CAR

[75] Inventor: Dietmar Dilcher, Vellmar, Fed. Rep. of Germany

[73] Assignee: Gebr. Bode & Co. GmbH, Kassel, Fed. Rep. of Germany

[21] Appl. No.: 716,049

[22] Filed: Mar. 26, 1985

[30] Foreign Application Priority Data

Mar. 26, 1984 [DE] Fed. Rep. of Germany ....... 3411073

[51] Int. Cl.⁴ ............................................ E05D 15/10
[52] U.S. Cl. ...................................... 49/212; 49/215; 49/221
[58] Field of Search ................. 49/212, 213, 214, 215, 49/216, 223, 225

[56] References Cited

U.S. PATENT DOCUMENTS

| | | | |
|---|---|---|---|
| 3,230,585 | 1/1966 | Marsh | 49/216 X |
| 3,384,995 | 5/1968 | Furrer | 49/213 |
| 3,484,993 | 12/1969 | Erb et al. | 49/216 |
| 3,501,864 | 3/1970 | Erb et al. | 49/215 |
| 3,520,083 | 7/1970 | Erb et al. | 49/212 |

Primary Examiner—Kenneth Downey
Attorney, Agent, or Firm—Roberts, Spiecens & Cohen

[57] ABSTRACT

A swingable sliding door for a motor vehicle comprising a door panel movable between open and closed positions for a door opening in a body. A swing arm is pivotably connected to the body and a carriage is pivotably connected to the swing arm. An elongated support is mounted on the door panel and the carriage is slidably mounted on the support for undergoing slidable movement thereon as the door panel travels between its open and closed positions. The carriage is preferably in the form of a sleeve and the elongated support is preferably in the form of a bar which slidably supports the sleeve. The swing arm is pivotably supported at the bottom of a vertical pivot shaft secured to the body.

13 Claims, 4 Drawing Figures

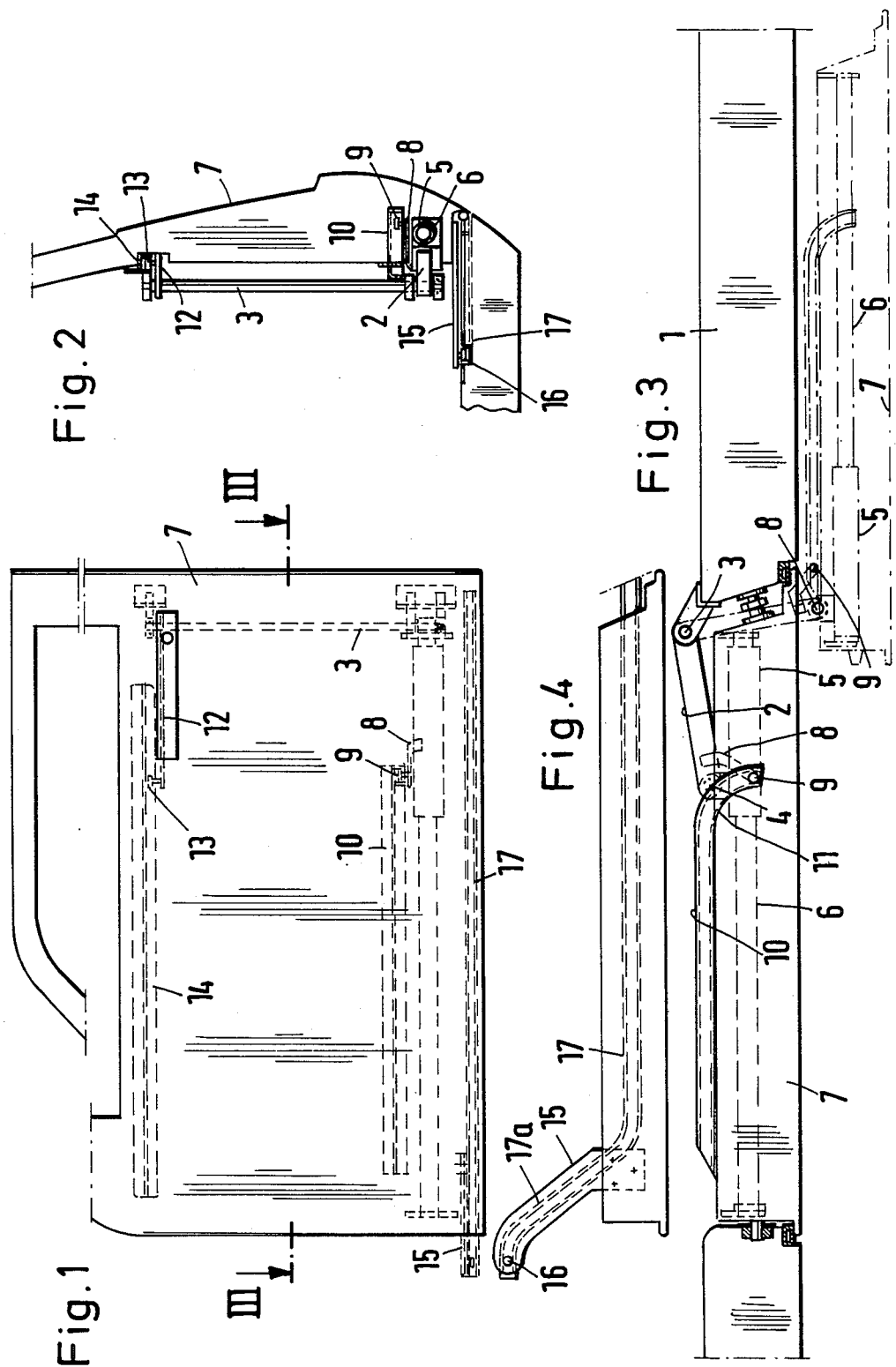

SWINGABLE SLIDING DOOR FOR A MOTOR VEHICLE UTILIZING A SWING ARM MOUNTED ON THE BODY OF THE CAR

FIELD OF THE INVENTION

The invention relates to a swingable sliding door for an automotive vehicle, particularly a passenger car, in which the door panel is brought out of the door opening by means of a swing arm which is mounted on the body of the car.

PRIOR ART

Swingable sliding doors for automotive vehicles, particularly for a passenger car, are known.

In one known embodiment, two swing arms are arranged in the manner of a parallelogram linkage for the swinging out of the door panel, the ends of the swing arms being provided with vertical columns at the ends of which are secured gears which engage corresponding racks arranged on the door panel. In this arrangement, the weight of the door is resisted by the swing arms and the gears coupled to the rack.

Such a door, however, is limited in its width in order to assure dependable operation of the gears and rack, particularly as no further guide means for the door panel can be provided at the upper edge in the case of a passenger car. Additionally, this construction involves considerable cost of manufacture due to the gears and rack as well as the parallelogram linkage.

Sliding doors for passenger cars are also known in which a guide means in the form of an articulated roller carriage is arranged at the central vertical edge of the door panel, the roller carriage traveling in a rail arranged on the outside of the wall of the car body, additional guide means being provided at the lower edge of the door.

SUMMARY OF THE INVENTION

An object of the present invention is to provide a swingable sliding door for automotive vehicles, particularly for a passenger car, in which a considerable width of door can be used and in which the guide means is provided only in the central and/or lower regions of the door panel, no guide means being required on the outside on the body of the car.

This object is achieved, according to the invention, by a construction in which the swing arm is fastened to a pivot shaft, and a carriage which receives a support fastened to the door panel is pivotally arranged on the end of the swing arm. In a specific embodiment, the carriage comprises a sleeve which receives the support which is constituted as a bar, the swing arm being supported at the bottom of the pivot shaft.

In this embodiment, the entire weight of the door panel is resisted by the swing arm which is connected at the bottom of the pivot shaft.

In order that the outward swinging motion can take place properly, a rigid guide arm is fastened to the swing arm and a roller is arranged on the end of said guide arm and engages in a guide rail which is fastened to the door panel and has a curved end portion.

By this construction, upon outward swinging motion, the door panel is dependably guided by the rigid guide arm and the guide rail with its curved end portion.

In order that the door panel cannot tip laterally, the pivot shaft has a rigid holding arm with a guide roller spaced from the swing arm, the guide roller traveling in a guide rail which is secured to the door panel.

A guide means and a fixed guide rail for the guide means are arranged on the door panel on the side edge thereof opposite the swing arm.

Since the carriage, which is constructed as a sleeve, resists the entire weight of the door panel, it is not necessary to provide a supporting guide means on the outside of the vehicle, particularly at the mid-height or at the upper edge of the vehicle. Furthermore, a door panel of considerable width can be used since the weight of the door can be reliably resisted by the construction according to the invention.

BRIEF DESCRIPTION OF THE FIGURES OF THE DRAWINGS

An illustrative embodiment of the invention is shown in the drawing, in which:

FIG. 1 is a side, elevational view, from the outside, of the swingable sliding door of the invention;

FIG. 2 is an end view thereof;

FIG. 3 is a sectional view taken along line III—III in FIG. 1 and

FIG. 4 is a view taken along line III—III in FIG. 1 showing the guide means on the side of the door panel which is opposite the swing arm.

DETAILED DESCRIPTION OF THE PREFERRED EMBODIMENT

In FIG. 3, there is seen a part of a car body 1 to which a swing arm 2 is pivotably mounted by pivotal support on a pivot shaft 3. A carriage 5 in the form of a sleeve, is arranged at the end of the swing arm 2, said carriage being mounted on a support 6 constituted as a bar which is fastened to a door panel 7.

The weight of the door panel 7 is resisted by means of the swing arm and the carriage. Upon displacement at the door, the bar 6 slides within the sleeve 5 as evident from the chain-dotted, open position of the door panel in FIG. 3.

In order for the door panel 7 to be properly guided upon its outward pivotal movement to its open position, a rigid guide arm 8 is secured on the swing arm 2 and supports a guide roller 9 having a vertical pin mounted in arm 8, the roller 9 traveling in a guide rail 10 which is mounted on the inside of the door panel 7. The guide rail 10 has a curved portion 11 at one end. The swinging motion of the door panel to its outward position is controlled and effected by the curved portion 11 in cooperation with the rigid guide arm 8.

A rigid holding arm 12 is mounted on the pivot shaft 3 at a distance above the swing arm 2. The holding arm 12 supports a guide roller 13 having a vertical shaft. The guide roller 13 travels in a rail of inverted, U-shape, cross-section fastened to the inside of the door panel 7.

This rigid holding arm 12, in combination with the guide roller 13 and the inverted U-shaped rail 14, prevents lateral tipping of the door panel 7 without applying the weight of the door panel to the rail 14.

In order for the door panel to be guided at the end opposite the swing arm 2, a guide means 15 is arranged at the opposite end. The guide means 15 is in the form of a rigid arm having a guide roller 16 which travels in a stationary guide rail 17 which is curved at end 17a so that this part of the door panel also can participate in the outwards swinging motion. As evident in FIGS. 2 and 4 guide rail 17 is disposed inside of the closed door panel.

The carriage 5, which is in the form of a sleeve, has suitable bearings which can resist the weight of the door panel and assure its easy displaceability.

Although the invention has been described in conjunction with a specific embodiment thereof, it will become apparent to those skilled in the art that numerous modifications and variations can be made within the scope and spirit of the invention as defined in the attached claims.

What is claimed is:

1. A swingable sliding door for a motor vehicle comprising a door panel movable between open and closed positions for a door opening in a vehicle body, a swing arm pivotably connected to the vehicle body, a carriage pivotably connected to said swing arm, an elongated support on said door panel, said carriage being slidably mounted on said support for undergoing slidable movement thereon as said door panel travels between said open and closed positions, said carriage comprising a sleeve, said elongated support comprising a bar slidably supporting said sleeve, and guide means connected to the door panel and to said swing arm for guiding the movement of the door panel between said open and closed positions, said guide means being constructed so as not to bear any weight of the door, said carriage providing a support and guide function for the door panel such that the weight of the door panel is transmitted substantially from said bar through said sleeve to the swing arm.

2. A swingable sliding door as claimed in claim 1 comprising a vertical pivot shaft secured to said body and pivotably supporting said swing arm.

3. A swingable sliding door as claimed in claim 2 comprising a rigid holding arm on said vertical pivot shaft in vertically spaced relation with said swing arm, a guide roller on said holding arm, said door panel including a further guide rail, said guide roller being rollably supported in said further guide rail.

4. A swingable sliding door as claimed in claim 3 wherein said further guide rail is of inverted U-shape and said guide roller is inserted from below into said further guide rail for preventing lateral tipping movement of the door panel without applying the weight of the door panel to the further guide rail.

5. A swingable sliding door as claimed in claim 1, said guide means comprising a rigid guide arm secured to said swing arm, a guide roller on said guide arm, and a guide rail on said door panel in which said guide roller is rollably supported, said guide rail including a curved end portion for producing lateral movement of the door panel in going between the open and closed positions thereof.

6. A swingable sliding door as claimed in claim 5 wherein said guide rail is disposed at a level above said support.

7. A swingable sliding door as claimed in claim 6 wherein said support comprises a bar slidably fitted in said carriage.

8. A swingable sliding door as claimed in claim 1 wherein said door panel has opposite side edge portions, said swing arm being located at one of said side edge portions, and guide means at the other side edge portion for guidable support of said door panel thereat.

9. A swingable sliding door as claimed in claim 8 wherein said guide means comprises a stationary guide rail secured to said body adjacent the bottom of the door panel, and a guide member secured to said door panel and guidably supported on said guide rail.

10. A swingable sliding door as claimed in claim 2 wherein said swing arm is supported by said vertical pivot shaft proximate the bottom thereof.

11. A swingable sliding door as claimed in claim 1 wherein said door panel has an inside and an outside, said guide rail being on the inside of the door panel.

12. A swingable sliding door as claimed in claim 3 wherein said door panel has an inside and an outside, said further guide rail being on the inside of the door panel.

13. A swingable sliding door as claimed in claim 9 wherein said door panel has an inside and an outside, said stationary guide rail being inside of the door panel in closed position thereof.

* * * * *